United States Patent Office 3,316,614
Patented May 2, 1967

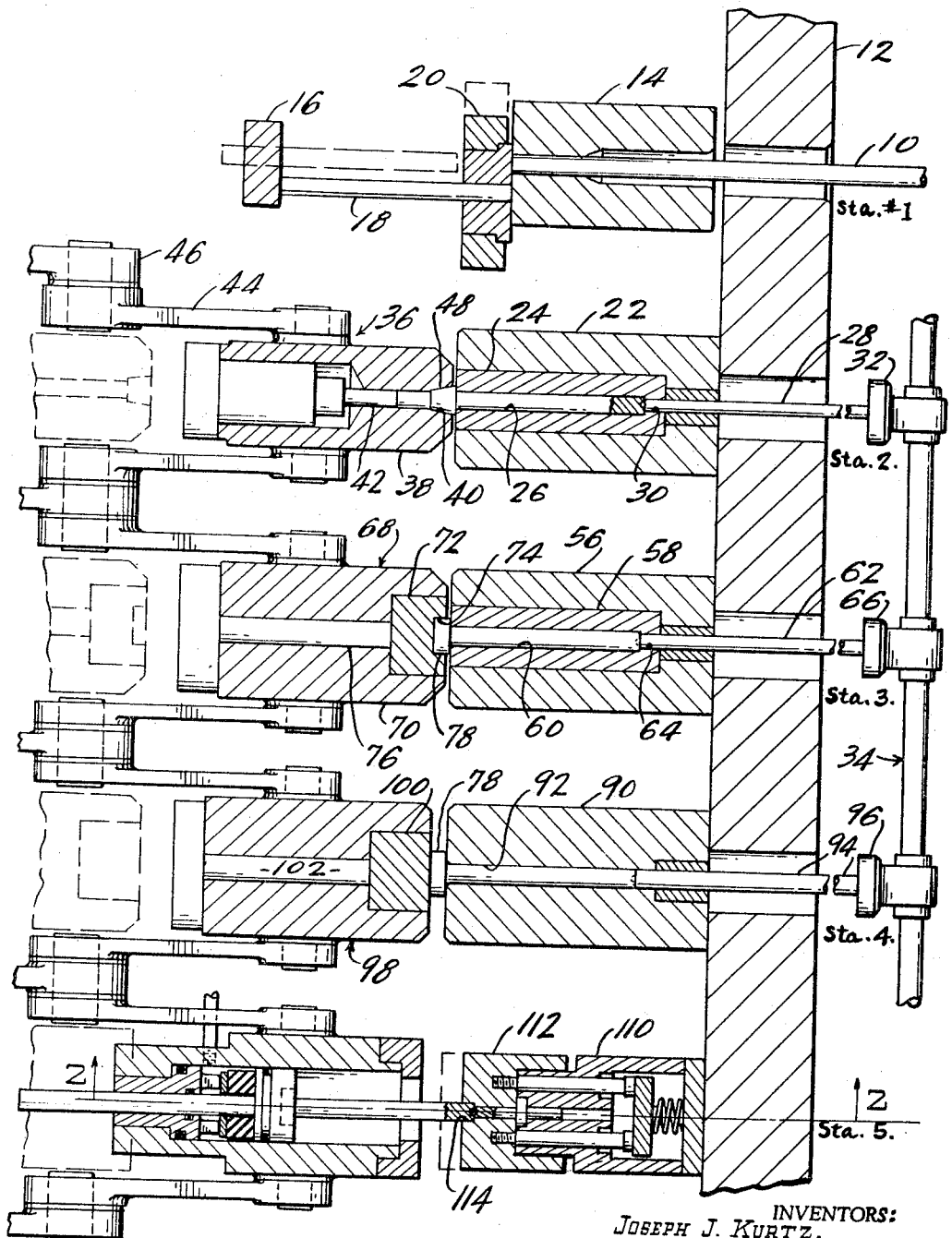

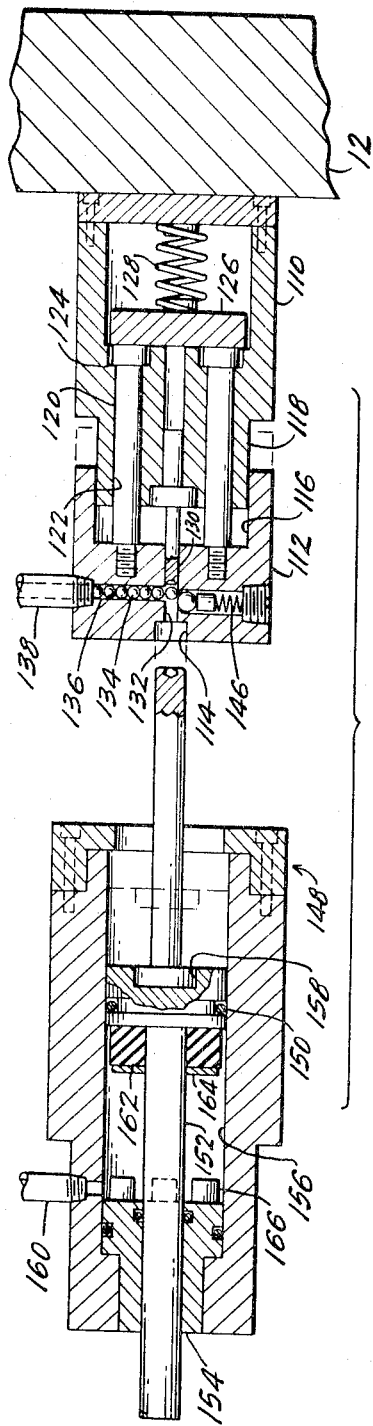
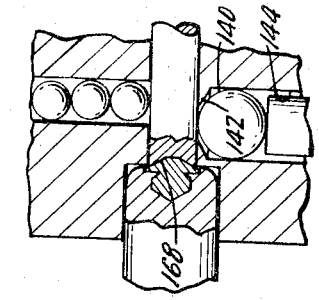
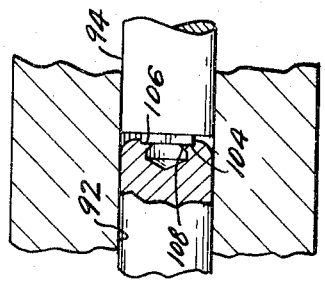
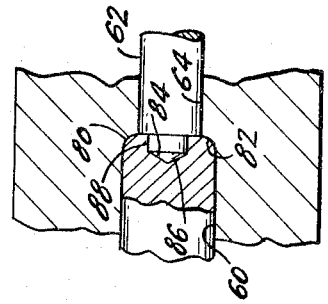
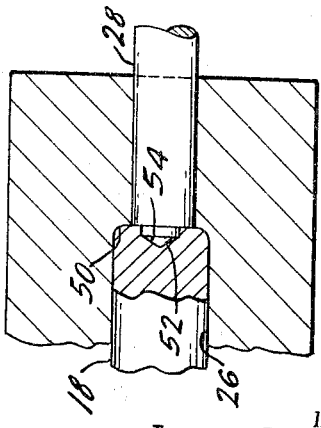

3,316,614
METHOD AND APPARATUS FOR MAKING MULTI-PART PRODUCTS
Joseph J. Kurtz, Lorain, Dale A. Webster, Elyria, and John J. Kurucz, Lorain, Ohio, assignors to Gregory Industries, Inc., Lorain, Ohio, a corporation of Michigan
Original application Sept. 17, 1964, Ser. No. 397,259. Divided and this application Mar. 30, 1966, Ser. No. 538,850
9 Claims. (Cl. 29—34)

This application is a division of Ser. No. 397,259, filed Sept. 17, 1964, now allowed.

This invention relates to a method and apparatus for making and assembling products having two or more parts and particularly for making studs having an insert of solid flux at the weldable end.

Solid flux studs of the type shown in Nelson Patent 2,612,394, for example, are continually finding greater use in the art. Heretofore, the production of such studs has required several operations, with the general shape of the stud being formed from bar stock, the end of the stud then being machined, and, finally, the solid flux being applied to the weldable end of the stud. These operations are performed on different machines at different locations and required considerable time, labor, and capital outlay.

The present invention relates to a method and apparatus for producing studs and other multi-part products more rapidly, with fewer operations, less equipment and at less expense. In accordance with the invention, specifically illustrated in connection with a weldable stud, the weldable end of the stud is shaped and the slug or insert of flux is added as the stud is formed in a cold heading machine, rather than by shaping the weldable end and adding the flux as additional, separate operations on separate machines.

It is, therefore, principal object of the invention to provide an improved method and apparatus for making multi-part products more rapidly, with fewer operations, and at lower cost.

Another object of the invention is to provide an improved method and apparatus for loading and shaping a second part in an end of a first part of a multi-part product.

Other objects and advantages of the invention will be apparent from the following detailed description of a preferred embodiment thereof, reference being made to the accompanying drawings, in which:

FIG. 1 is a somewhat schematic view in horizontal cross section of five stations of a cold heading machine for making multi-part products, specifically end weldable studs, according to the invention;

FIG. 2 is an enlarged view in vertical cross section, taken along the line 2—2 of FIG. 1, of the fifth station of the machine, with the parts being in a different position;

FIGS. 3–5 are further enlarged sectional view of parts of die recesses and ejector pins of the second, third, and fourth stations of the machine shown in FIG. 1; and FIG. 6 is an enlarged sectional view of a die recess a forming punch, and slug feeding means of the machine shown in FIG. 2.

Referring to the drawings, and more particularly to FIG. 1, five stations of a cold heading machine are shown, somewhat schematically. Bar stock 10 is fed to a first, cutting station from a suitable source of supply through an opening in a bolster plate 12, through a guide block 14, and against a stop member 16. A piece 18 of stock predetermined length is then severed by a cutter 20 which moves transversely to the longitudinal extent of the piece 18 and shears it with respect to the guide block 14.

From the first station, the stock piece 18 is transferred to a second station which includes a die body or holder 22 suitably affixed to the bolster plate 12 and supporting a first die 24 having a first die recess 26 therein. A first ejector or forming pin 28 is aligned with the die recess 26 and extends through an end opening 30 concentric with the recess 26. The ejector pin 28 has a driving head 32 which is driven by a cam and drive shaft arrangement generally indicated at 34, or by any other suitable means operating in timed relation to the heading and forming mechanisms hereinafter described. The specific means for operating the ejector pin 28 does not constitute part of the invention and the cam assembly is shown for purposes of illustration. Aligned with the die recess 26 is a first hammer or plunger assembly 36 which includes a heading die 38 having a heading recess 40, and a punch 42. The hammer 36 is moved in a straight line toward and away from the die 24 between a forward position shown in solid lines and a retracted position shown in dotted lines. This movement can be accomplished by any suitable crank or cam mechanism that will impart the necessary periodic strokes to the plungers through connecting links 44 and 46.

The hammer 36 is held in the retracted position while the stock piece 18 is moved between it and the die 24 and brought into alignment with the die recess 26 and the heading recess 40. The hammer is then moved forwardly with one end of the stock piece 18 entering the heading recess 40 until stopped by the punch 42, with the other end entering the die 24 until stopped by the end of the recess 26. After this point, the hammer 36 continues to move toward the die 24 and causes a tapered enlargement 48 to be formed on the stock 18 by the die member 38. At the same time, the opposite or flux end of the stock piece 18 is rounded by a rounded end portion 50 of the die recess 26.

After the hammer reaches the forward position shown in solid lines, the ejector pin 28 is moved forwardly through the opening 30 to strike the rounded end of the stock piece 18. This ejector pin is provided with a small pin extension 52 to form an initial recess 54 in the rounded end of the stock piece 18. The hammer 36 is then moved to the retracted position with the pin 28 moving forwardly to eject the partially formed stock piece 18 from the recess 26. Hence, in the second station, the enlargement 48 is formed on the piece 18, the initially rounded end is formed thereon, and the initial recess 54 is also produced.

The partially formed stock piece 18 is then transferred to a third station where the formation of the stud head and the shaping of the weldable end are completed. The third station includes a second die body 56 affixed to the bolster plate 12 and having a second forming die 58, a die recess of which is designated 60. A second ejector and forming pin 62 extends through an end opening 64 in the die 58 and also has a driving head 66. A second hammer or plunger assembly 68 is located at the third station and includes a head die 70 having an insert 72 forming a heading die recess 74. The hammer 68 also includes a punch 76 backing up the insert 72. The second hammer 68 also is moved between a retracted position shown in dotted lines and the forward position shown in solid lines, always being in alignment with the die recess 60.

When the partially finished stock piece 18 is moved between the die 58 and the hammer 68, it is pushed into the die recess 60 until the weldable or flux end bottoms on the end of the recess 60, with the head end of the piece in the closing path of the heading die 74. A completed stud head 78 then is formed on the piece 18 with the closing movement of the plunger assembly 68. The weldable or flux end of the piece 18 is simultaneously further rounded to produce a final rounded end 80 by virtue of a further rounded end portion 82 at the bottom of the die recess 60. A flux recess 84 is also formed to final depth in the end of the piece by a tapered end portion of the ejector pin 62 constituting a conical tip 86 (FIG. 4) and an adjacent cylindrical projection 88. The flux recess can be completed as the stud piece is forced into the die recess 60 by the hammer 68, with the conical portion 86 and cylindrical portion 88 extending into the end of the die recess.

The stock piece 18 with the now-completed head 78 and the fully rounded end 80 is then transferred to a fourth forming station where a crimping operation is performed on the flux end of the stud. The fourth station includes a die member 90 having a central longitudinal passage 92 instead of a die recess. An ejector and forming pin 94 extends into the passage 92 and has a driving head 96 similar to those previously discussed. A third hammer or plunger assembly 98, in this instance, simply includes a flat back-up insert 100 and a punch 102. The insert 100 engages the stud head 78 and forces the piece into the passage 92 but does not further form the head 78.

As shown best in FIG. 5, the pin 94 is of the same diameter as the passage 92 and has an elongate crimping projection 104, the dimension across which exceeds the existing diameter of the recess 84. When the crimping projection 104 engages the end of the stock piece 18, it produces a pair of diametrically opposed small recesses 106 in the end of the stud piece and, at the same time, strikes radially inwardly extending projections 108 on the adjacent end of the stock piece. The projections 108 are important because they subsequently retain the flux slug in the recess very securely. Otherwise, the slugs have been found to have a tendency to fall out of the recess. This apparently results because the walls of the recess 84 are relatively smooth due to the way in which they are formed, and also because they have a slight taper, which represents the draft necessary for withdrawal of the forming end of the pins.

The stud or one part of the product at this time is complete except for the assembling or loading of the flux or second part, which is performed at the fifth or assembling station to complete the product. This station includes a die support 110 affixed to the bolster plate 12 and yieldably holding a die member 112 having a relatively shallow die recess 114. The die member 112 also has a guide recess 116 (FIG. 2) cooperating with a guide projection 118 of the die body support 110. Four guide pins 120 are affixed to the die member 112 and extend through guide passages 122 in the die support 110 to terminate in heads 124. The four guide pins 120 are engaged by a spring pressed plate 126 which is urged outwardly by a spring 128, the outward movement being limited by the guide pin heads 124.

A supply and flux slug forming punch 130 is suitably retained in the die holder 110 and projects longitudinally into a slug feed passage 132 located coaxially with the shallow recess 114. The feed passage 132 is just slightly larger than flux slugs 134 which are fed sequentially to the feed passage 132 from a supply passage 136 communicating with a supply line 138 or a hopper. When the flux slugs are fed to the feed passage 132, they are restricted from moving in one direction by the punch 130 and in the opposite direction by a spring-loaded detent ball 140 (FIG. 6). The ball 140 projects slightly into the feed passage 132 through a restricted opening 142 at the end of a detent passage 144, being urged in this direction by a suitable coil spring 146 (FIG. 2).

A ram assembly 148 for bringing the stud into position to be loaded with flux includes an air-operated piston 150 carrying a piston rod 152 extending rearwardly through an end member 154 forming part of an air cylinder 156, although a spring could be substituted. The piston 150 has a stud holding recess 158 to receive and engage the head 78 of the stud and to move the stud into the shallow recess 114 of the die member 112. When the ram 148 moves forwardly, the piston 150 moves rearwardly against the pressure of air in the cylinder 156 supplied through a line 160. At the end, a rubber bumper 162 and a metal washer 164 on the rear of the piston 150 will engage a spacer 166 adjacent the end member 154 and provide the final force on the stud. In the event that one of the studs is slightly longer than usual, the rubber will yield to prevent excess force on and deformation of the stud.

The pressure in the air cylinder 156 is sufficient to overcome the force of the spring 128 so that as the ram 148 moves toward the die member 112, it will compress the spring and move the member 112 rearwardly until the pressure of the air is overcome. As the die member 112 moves rearwardly, the punch 130 remains stationary so that it moves the flux slug 134 through the feed passage 132, past the detent ball 140, and toward the stud recess 84. The slug 132 is finally forced into the recess 74 and shaped to a slightly truncated conical configuration by a shallow truncated conical forming hole or recess 168 in the end of the punch 130. The cooperation of the bumper 162 and the spacer 166 in the cylinder 156 is sufficient to back up the stud during this inserting and forming operation. The flux slug is preferably of a diameter slightly larger than the diameter of the recess 84 so as to completely fill the recess and also to extend outwardly slightly as shown in FIG. 6 as a result of the configuration of the forming hole 168.

When the ram assembly 148 backs away, the spring 128 moves the die member 112 outwardly, with the punch 130 then retracting relative to the passage 132. As the punch 130 moves past the detent ball 140, the ball again projects into the feed passage 132, and after the punch moves to the rear of the supply passage 136, another of the flux slugs 134 is fed downwardly into the feed passage, ready for another operation.

The final slug loading or assembling operation completes the stud or product which is formed in the five station cold heading machine without any extra time or additional machines being required.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A cold heading machine comprising a plurality of stations, each of several stations comprising a forming die to receive and shape a portion of a first part, and hammer means for moving the first part toward the die and for holding the part in a fixed position relative to the die; at least one station comprising means for holding a plurality of second parts, means for receiving the shaped portion of the first part, and means for forcing one of the second parts into assembled relationship with the portion of the first part.

2. A cold heading machine according to claim 1 further characterized by ejector means for ejecting the first part from the die and for forming a recess in the portion of the first part.

3. A cold heading machine according to claim 2 wherein said forming die has a recess which receives and shapes the portion of the first part and the ejector means ejects the first part from the die recess, and the hammer means includes a heading die for moving the first part toward the die recess and for holding the part in the recess.

4. A cold heading machine comprising at least one forming station for shaping a first part of a product to be assembled on said cold heading machine, said first station including supporting means, a die holder supported by said supporting means, and a die held by said holder, said die having a recess for aiding in holding and positioning the first product part, said first station further including a hammer assembly comprising a heading die having a recess to aid in shaping a portion of the first product part, a crank means for moving said heading die toward and away from said die recess; and an assembling station in a side-by-side relation with said first station and comprising additional supporting means, a receiving member held by said additional supporting means to receive and position a portion of the first product part, means for feeding second product parts to said receiving member, means associated with said receiving member for moving one of the second product parts into assembled relation with the first product part, and means for moving the first product part into said receiving member and supporting the first product part during assembling of the second product part.

5. A cold heading machine according to claim 4 and further comprising ejector means aligned with said die recess, and means for moving said ejector means into said recess to aid in removing the first product part therefrom.

6. A cold heading machine according to claim 5 characterized by said heading die shaping one portion of the first product part, said die recess and said ejecting means shaping another portion of the first product part, and said assembling station assembling the second product part with one of said shaped portions of the first product part.

7. A cold heading machine according to claim 4 wherein said die shapes a portion of the first product part and the assembling station assembles the second product part with the shaped portion of the first product part.

8. A cold heading machine according to claim 5 wherein said ejector means constitutes an ejector pin which aids in forming a recess in the first product part and the assembling station forces the second product part into the recess.

9. A cold heading machine comprising a plurality of stations, at least one of said stations comprising a forming die to receive and shape a portion of a first part, and hammer means for moving the first part toward the die and for holding the part in a fixed position relative to the die while being shaped; at least one station adjacent the first station and comprising means for sequentially receiving and holding a plurality of second parts, means for receiving and holding the first part after being shaped at the first station, and means for moving at least one of the first and second parts toward the other to force the second part into assembled relationship with the shaped portion of the first part.

References Cited by the Examiner
UNITED STATES PATENTS

| | | | |
|---|---|---|---|
| 2,607,106 | 8/1952 | Reardon | 29—33.9 |
| 2,724,200 | 11/1955 | Larmour | 29—34 |

RICHARD H. EANES, JR., *Primary Examiner.*